United States Patent [19]

Morris

[11] Patent Number: 5,311,776
[45] Date of Patent: May 17, 1994

[54] PRE-INSTALLATION LIQUID LEVEL GAUGE ASSEMBLY WITH THREAD PROTECTOR

[75] Inventor: Lloyd R. Morris, Flower Mound, Tex.

[73] Assignee: Rochester Gauges, Inc., Dallas, Tex.

[21] Appl. No.: 46,091

[22] Filed: Apr. 12, 1993

[51] Int. Cl.⁵ .................... B65D 59/00; G01F 23/00
[52] U.S. Cl. ........................... 73/306; 73/317; 138/96 T
[58] Field of Search ................. 73/305, 306, 317; 138/96 T

[56] References Cited

U.S. PATENT DOCUMENTS

| Re. 18,184 | 9/1931 | Brown et al. | 138/96 T |
|---|---|---|---|
| 1,489,785 | 4/1924 | Porter | 138/96 T |
| 2,253,729 | 8/1941 | Schuetz | 138/96 T |
| 2,316,013 | 4/1943 | Mulholland | 138/96 T |
| 2,365,888 | 12/1944 | Linderfelt et al. | 138/96 R |
| 3,012,437 | 12/1961 | Clark et al. | 73/317 |
| 3,199,902 | 8/1965 | Fierstine | 138/96 R X |
| 3,485,271 | 12/1969 | Halsey | 138/96 T |
| 3,578,200 | 5/1971 | Hertzer | 138/96 T X |
| 3,638,493 | 2/1972 | Schoepflin | 73/317 |
| 4,038,507 | 7/1977 | Murphy et al. | 73/317 X |
| 4,318,426 | 3/1982 | Callanan et al. | 138/96 T |
| 4,800,496 | 1/1989 | Barber et al. | 324/337 X |

Primary Examiner—Daniel M. Yasich
Attorney, Agent, or Firm—Richards, Medlock & Andrews

[57] ABSTRACT

A pre-installation liquid level gauge assembly is provided which comprises a fitting with a threaded outer surface and a thread protector friction fit over the threaded outer surface. The thread protector comprises a sleeve portion and a shoulder portion extending radially inwardly to protect the end of the fitting and prevent the sleeve portion from sliding up the fitting to expose some of the lower threads. The shoulder portion defines a hole that is larger than the outer diameter of the passage in the fitting so that the thread protector does not interfere with the insertion of an extension piece into the passage in the fitting. The thread protector includes a tab and a scored line extending from the tab to the edge of the hole defined in the shoulder portion such that the tab can be pulled to totally split the thread protector to allow ready removal of the thread protector from the fitting.

25 Claims, 1 Drawing Sheet

PRE-INSTALLATION LIQUID LEVEL GAUGE ASSEMBLY WITH THREAD PROTECTOR

TECHNICAL FIELD OF THE INVENTION

The present invention relates to a liquid level gauge assembly with a thread protector that is friction fit over the threads of the fitting used in the construction of the assembly and allows assembly of the gauge components to the fitting while the thread protector remains on the threads of the fittings. The thread protector is readily removable from the fitting when the gauge is ready to be installed in a tank.

BACKGROUND OF THE INVENTION

Liquid level gauges are often used on tanks that contain highly pressurized, flammable fluids such as propane and CFC's. A longstanding problem exists in insuring zero leakage around the threads of the gauge fitting in the tank. One of the main causes of leaking threads is damage to the threads that occurred during assembly, packaging or shipping of the gauge. Leakage of fluids such as liquid petroleum and CFC's is highly dangerous and can result in explosions. Thus, it is extremely important that the gauge threads have no damage so there will be zero leakage around the threads when installed on a high pressure tank.

Liquid level gauges typically include a fitting that is threaded into a hole in a tank wall. The gauge dial is typically disposed on the head of the fitting outside the tank, and the fitting has a passage extending through it. An extension piece of some type is inserted into this passage that extends into the interior of the tank. The extension piece can be a tube or some type of rod. A float mechanism is assembled in conjunction with the extension piece to respond to the liquid level in the tank.

During assembly of the various gauge components to the fitting, the threads of the fitting are susceptible to being damaged by the various components and other gauges on the assembly line. The threads of the fitting are also exposed to damage during packaging, shipping and storage. Such damage to the threads can render the gauge assembly unusable, and, often, thread damage is not detected until the gauge is being installed. At this time, the gauge customer is tremendously inconvenienced by having to order a replacement gauge with undamaged threads.

Conventional thread protectors have been used on the fittings that cover the passage through the fitting. Such thread protectors must be removed before attachment of the extension piece in the fitting. Thus, the threads are still exposed to a risk of damage during the remaining assembly steps as well as packaging and shipping. Therefore, a need exists for a thread protector that can be used on fittings used in gauge assemblies that allows assembly of the gauge components to the fitting without having to remove the thread protector.

Furthermore, a thread protector that allows assembly of the gauge components to the fitting must be readily removable from the fitting when the gauge is ready to be installed on a tank. A sleeve-like thread protector can not be removed over many of the types of float mechanisms which are attached to extension pieces extending from the fittings. Thus, a need exists for a thread protector that not only allows assembly of the extension piece to the fitting but that can then be readily removed from the threads without having to run the protector down over the end of the extension piece and any mechanisms attached to the extension piece.

A need also exists for a pre-installation gauge assembly that provides for protection of the threads of the fitting that is readily removable prior to installation of the gauge assembly. A need also exists for a method of protecting the threads of a gauge fitting during the manufacture, packaging and shipping of the gauge assemblies.

Additionally, a sealant is often used on the threads of the fittings when they are threaded into a hole in a tank wall. A need exists to be able to apply the sealant in the threads of the fitting at the gauge assembly plant without risk of contaminating or disturbing the sealant during assembly, packaging, and shipping. With suitable protection for pre-applied sealant, installation of the gauge assemblies is simplified by eliminating the need to apply sealant at the point of installation.

SUMMARY OF THE INVENTION

One aspect of the present invention provides a pre-installation liquid level gauge assembly with protected threads. The assembly comprises a fitting which has a threaded outer surface and a first end and a second end. The fitting defines a passage extending into the second end of the fitting. The thread protector is friction fit over at least a portion of the threaded outer surface of the fitting.

The thread protector comprises a sleeve portion having an open end that is slid over the second end of the fitting and towards the first end of the fitting. The sleeve portion also is a shoulder end longitudinally opposite the open end. The sleeve portion is sufficiently thick to protect the portion of the threaded outer surface from being damaged during assembly.

The thread protector also comprises a shoulder portion extending radially inwardly from the shoulder end of the sleeve portion to define a hole with a diameter greater than the outer diameter of the passage. The shoulder portion abuts alongside the second end of the fitting and extends radially inwardly sufficiently to prevent the shoulder portion from being pushed over the second end of the fitting. The shoulder portion is of sufficient thickness to protect the second end of the fitting from being damaged during assembly.

The thread protector also comprises a tab extending from the open end of the sleeve portion so as to define a first corner and a second corner where the tab joins the sleeve portion. The tab is sized such that it is readily pullable. A scored line extends from the first corner across the sleeve portion and shoulder portion to the hole. The scored line is scored such that when the tab is pulled, the thread protector splits from the open end of the sleeve portion to the hole defined by the shoulder portion along the scored line.

The gauge assembly also comprises an extension piece having a fixed end attached to the fitting in the passage and a free end opposite thereto. A float mechanism is attached to the extension piece.

Another aspect of the present invention provides a thread protector as described above. Another aspect of the present invention provides a method of assembling a liquid level gauge assembly so as to protect the threads of the fitting until installation. Another aspect of the present invention involves the pre-installation liquid level gauge assembly as described above in combination with a sealant impregnated in the threads of the fitting which is protected by the thread protector.

The present invention provides for protection of the threads of a liquid level gauge fitting continually during the manufacturing process of the gauge assembly as well as during packaging and shipping. The present invention allows assembly of the gauge while the thread protector remains on the fitting. The present invention also allows for the ready removal of the thread protector prior to installation of the gauge assembly.

The present invention reduces the number of unusable gauge assemblies due to damaged threads. Furthermore, one aspect of the present invention allows sealant to be pre-applied to the threads of the gauge assembly at the manufacturing stage, thus eliminating the need to apply sealant at the point of installation. The thread protector prevents disturbance of the sealant during further assembly, packaging and shipping of the gauge assembly so that pre-application of the sealant at the manufacturing stage is feasible.

DETAILED DESCRIPTION

Figure 1:
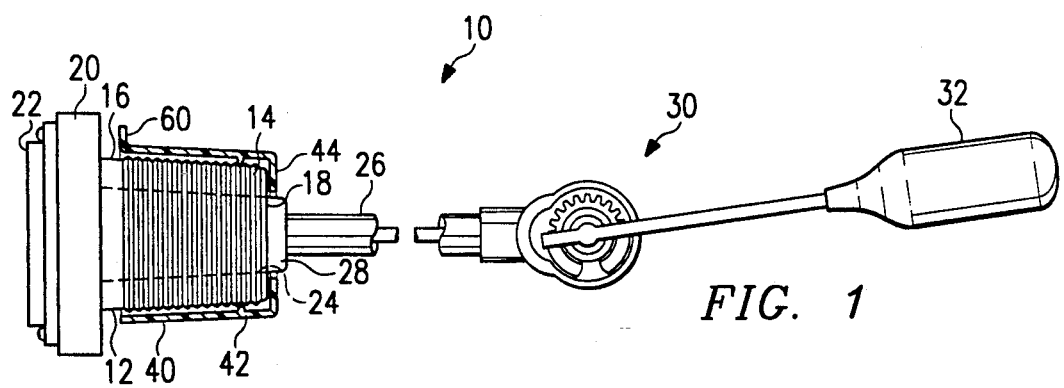
FIG. 1 is a side view of a pre-installation gauge assembly of the present invention with the thread protector shown in section on the fitting.

With reference to FIG. 1, an embodiment of pre-installation gauge assembly 10 of the present invention is shown. Assembly 10 comprises a fitting 12 with threaded outer surface 14. Fitting 12 has a first end 16 and second end 18. Attached to first end 16 is flange 20 with gauge dial 22. Fitting 12 defines passage 24 which extends through the fitting. Extension piece 26 extends from second end 18 of fitting 12. Extension piece 26 has fixed end 28 which is pressed into passage 24 at second end 18 of fitting 12 and free end 30 which can extend up to 48 inches long. Float mechanism 32 is attached to free end 30 of extension piece 26.

Thread protector 40 is friction fit over threaded outer surface 14. Sleeve portion 42 is sufficiently long to cover the threads, and shoulder portion 44, which extends radially inwardly, is disposed proximate second end 18. Sleeve portion 42 will be exposed to forces during manufacture of the gauge that may tend to force sleeve portion 42 towards first end 16. Thus, shoulder portion 44 must extend radially inwardly enough to be able to prevent sleeve portion 42 from sliding too far towards first end 16 and exposing threads near second end 18. Shoulder portion 44 also must be wide enough to prevent axially directed blows against second end 18 from raising burrs on the first few threads.

Shoulder portion 44, however, must have an inner diameter larger than passage 24 to allow fixed end 28 of extension piece 26 to be pressed into passage 24. Thus, shoulder portion must extend radially inwardly enough to protect second end 18 of fitting 12 but not so much that extension piece 26 cannot be inserted into passage 24.

Figure 2:
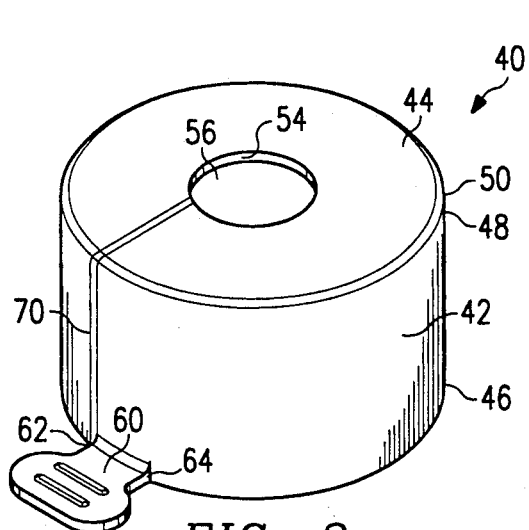
FIG. 2 is a perspective view of a thread protector of the present invention.
Figure 3:
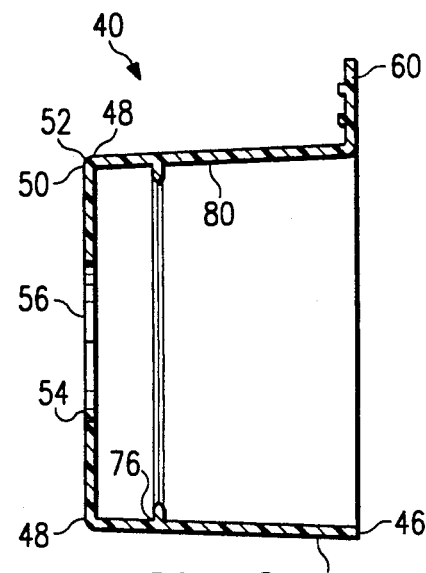
FIG. 3 is a cross-section of a thread protector of the present invention.
Figure 4:
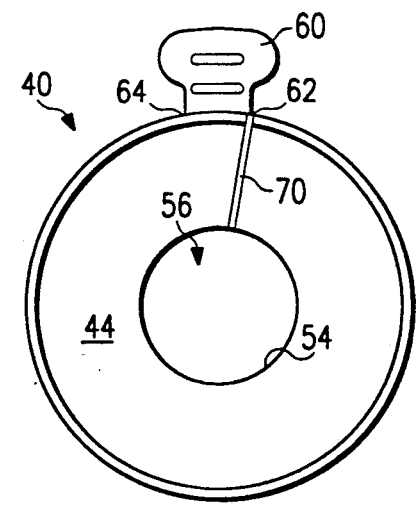
FIG. 4 is a top view of a thread protector of the present invention.

With additional reference to FIGS. 2-4, as well as FIG. 1, the thread protector can be seen in more detail. Sleeve portion 42 has open end 46 and shoulder end 48. Shoulder end 48 coincides with outer diameter 50 of shoulder portion 44. Shoulder portion 44 extends radially inwardly to inner diameter 54. Inner diameter 54 defines hole 56 which is larger than passage 24 of fitting 12. Thus, thread protector 40 has an axial extent, sleeve portion 42, and a radial extent, shoulder portion 44.

Thread protector 40 also comprises tab 60 extending outward from open end 46. Tab 60 is sized to facilitate ready grasping by two fingers. First corner 62 and second corner 64 are defined on each side of tab 60 where tab 60 is joined to sleeve portion 42.

Thread protector 40 also comprises scored line 70 which extends from first corner 62 across sleeve portion 42 and shoulder portion 44 to inner diameter 54. Scored line 70 can be created by any type of scoring process which sufficiently weakens thread protector 40 along scored line 70 so that when tab 60 is pulled outwardly, thread protector 40 is totally split along scored line 70 for removal of thread protector 40 from the threads. Scored line 70 must turn the corner from sleeve portion 42 to shoulder portion 44 to achieve the total split.

Figure 5:
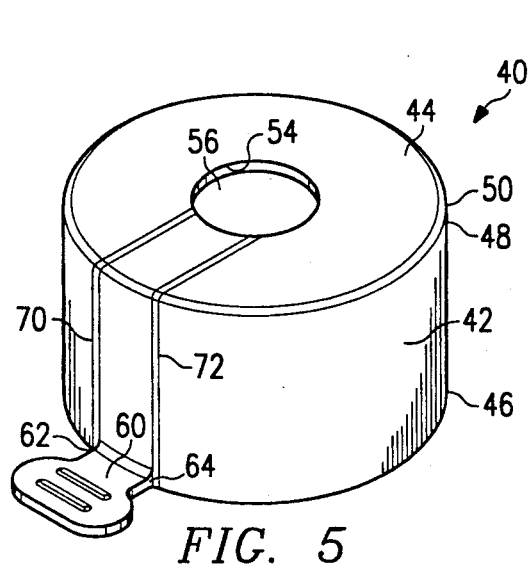
FIG. 5 is a perspective view of an alternative embodiment of a thread protector of the present invention.

In the alternative embodiment shown in FIG. 5, additional scored line 72 extends from second corner 64 generally parallel with scored line 70 such that a tear strip is created across thread protector 40 between scored line 70 and additional scored line 72.

In the preferred embodiment, sleeve portion 42 has at least one projection 76 extending radially inwardly from inside surface 80 of sleeve portion 42. Projection(s) 76 can be a ring extending the entire circumference of inside surface 80 or a plurality of spaced projections. Projection(s) 76 extend enough to provide a positive grip on the threads in addition to the friction fit. Inside surface 80 is sized such that it is friction fit over threaded outer surface 14, but if some type of sealant is impregnated in the threads, thread protector 40 may be susceptible to sliding off the fitting. Thus, projection(s) 76 prevent such unwanted movement. Projection(s) 76 can also be spaced axially in addition to being spaced circumferentially.

Preferably, thread protector 40 is injected molded from low density polyethylene. The presently preferred wall thickness of thread protector 40 is about 1/32 of an inch. The presently preferred width of scoring line 70 is about 1/32 of an inch. The presently preferred thickness of the scoring line section is about 0.02 inches as compared to 1/32 of an inch for the wall thickness. The differences in thicknesses has been found to provide a readily tearable scored line for splitting thread protector 40.

As an alternative embodiment, tab 60 could be attached to shoulder portion 44 instead of open end 46 of sleeve portion 42.

Assembly of pre-installation gauge assembly 10 comprises friction fitting thread protector 40 over threaded outer surface 14 until shoulder portion 44 abuts against second end 18. Then, during gauge assembly, extension piece 26 can be pressed into passage 24.

At the time gauge assembly 10 is to be installed in a tank, tab 60 is grasped and pulled to totally split thread protector 40 along scored line 70. Thread protector 40 can then be easily removed from fitting 12 to allow fitting 12 to be threaded into a hole in the tank.

In an alternative embodiment, pre-installation gauge assembly 10 further comprises a sealant impregnated between the threads. The sealant is first applied to the threads and then thread protector 40 is friction fit over fitting 12. In this embodiment, it is preferred that thread protector 40 have projection(s) 76 to positively engage one or more of the threads. The thread protector preserves the sealant as applied until the gauge assembly is to be installed. Thus, the sealant remains clean and undisturbed until installation. Without the thread protector, debris can collect in the sealant which could be detrimental to a proper seal or damage the threads on installation. Such an assembly eliminates the need to apply the sealant at the time of installation and thus prevents installation errors caused by improper application of sealant or use of the wrong type of sealant.

Although a few embodiments of the invention have been illustrated in the accompanying drawings and described in the foregoing Detailed Description, it will be understood that the invention is not limited to the embodiments disclosed, but is capable of numerous modifications, rearrangements, and substitutions of parts and elements without departing from the scope of the invention as defined by the following claims.

I claim:

1. A pre-installation liquid level gauge assembly, comprising:
   (a) a fitting having a threaded outer surface and having a first end and a second end, the fitting defining a passage extending into the second end of the fitting;
   (b) a thread protector friction fit over at least a portion of the threaded outer surface, the thread protector comprising
      (i) a sleeve portion having an open end for being slid over the second end of the fitting and towards the first end of the fitting, and a shoulder end longitudinally opposite the open end, the sleeve portion being of sufficient thickness to protect the portion of the threaded outer surface from being damaged during assembly;
      (ii) a shoulder portion extending radially inwardly from the shoulder end of the sleeve portion to define a hole with a diameter greater than the outer diameter of the passage, the shoulder portion abutting alongside the second end of the fitting and extending radially inwardly sufficiently to prevent the shoulder from being pushed over the second end of the fitting, the shoulder portion being of sufficient thickness to protect the second end of the fitting from being damaged during assembly;
      (iii) a tab extending from the open end of the sleeve portion so as to define a first corner and a second corner where the tab joins the sleeve portion, the tab sized such that it is readily pullable;
      (iv) a scored line extending from the first corner across the sleeve portion and shoulder portion to the hole, the scored line scored such that when the tab is pulled, the thread protector splits from the open end of the sleeve portion to the hole defined by the shoulder portion along the scored line;
      (v) an additional scored line extending from the second corner and running generally parallel to the scored line such that when the tab is pulled, a strip of material will be removed from the thread protector between the scored line and the additional scored line;
   (d) an extension piece having a fixed end attached to the fitting at the passage and a free end opposite thereto; and
   (e) a float mechanism attached to the extension piece.

2. The gauge assembly of claim 1 wherein the sleeve portion has an inside surface and the thread protector further comprises at least one projection extending radially inwardly from the inside surface, the at least one projection sized to positively engage the threaded outer surface of the fitting.

3. The gauge assembly of claim 2 wherein the at least one projection comprises a continuous ring extending from the inside surface of the sleeve portion.

4. The gauge assembly of claim 1 wherein the thread protector is injected molded plastic.

5. The gauge assembly of claim 1 wherein the sleeve portion and shoulder portion have substantially the same thickness of about 0.02 to about 0.04 of an inch.

6. The gauge assembly of claim 1 wherein the scored line is defined by a line of decreased wall thickness compared to the wall thickness of the remainder of the sleeve portion and the shoulder portion.

7. A thread protector adapted for friction fitting over at least a portion of a threaded outer surface of a fitting used in a liquid level gauge assembly, the fitting having a first end, a second end, and a passage in the second end, the thread protector comprising:
   (a) a sleeve portion having an open end for being slid over the second end of the fitting and towards the first end of the fitting, and a shoulder end longitudinally opposite the open end, the sleeve portion being of sufficient thickness to protect the portion of the threaded outer surface from being damaged during assembly;
   (b) a shoulder portion extending radially inwardly from the shoulder end of the sleeve portion to define a hole with a diameter greater than the outer diameter of the passage, the shoulder portion abutting alongside the second end of the fitting and extending radially inwardly sufficiently to prevent the shoulder from being pushed over the second end of the fitting, the shoulder portion of sufficient thickness to protect the second end from being damaged during assembly;
   (c) a tab extending from the open end of the sleeve portion so as to define a first corner and a second corner where the tab joins the sleeve portion, the tab sized such that it is readily pullable;
   (d) a scored line extending from the first corner across the sleeve portion and shoulder portion to the hole, the scored line scored such that when the tab is pulled, the thread protector splits from the open end of the sleeve portion to the hole defined by the shoulder portion along the scored line; and
   (e) a sealant impregnated in at least a portion of the threaded outer surface.

8. The gauge assembly of claim 7 wherein the sleeve portion has an inside surface and the thread protector further comprises at least one projection extending radially inwardly from the inside surface, the at least one projection sized to positively engage the threaded outer surface of the fitting.

9. The gauge assembly of claim 8 wherein the at least one projection comprises a continuous ring extending from the inside surface of the sleeve portion.

10. The gauge assembly of claim 7 wherein the sleeve portion and shoulder portion have substantially the same thickness of about 0.02 to about 0.04 of an inch.

11. The gauge assembly of claim 7 wherein the scored line is defined by a line of decreased wall thickness compared to the wall thickness of the remainder of the sleeve portion and the shoulder portion.

12. A thread protector adapted for friction fitting over at least a portion of a threaded outer surface of a fitting used in a liquid level gauge assembly, the fitting having a first end, a second end, and a passage in the second end, the thread protector comprising:

(a) a sleeve portion having an open end for being slid over the second end of the fitting and towards the first end of the fitting, and a shoulder end longitudinally opposite the open end, the sleeve portion being of sufficient thickness to protect the portion of the threaded outer surface from being damaged during assembly;

(b) a shoulder portion extending radially inwardly from the shoulder end of the sleeve portion to define a hole with a diameter greater than the outer diameter of the passage, the shoulder portion abutting alongside the second end of the fitting and extending radially inwardly sufficiently to prevent the shoulder from being pushed over the second end of the fitting, the shoulder portion of sufficient thickness to protect the second end from being damaged during assembly;

(c) a tab extending from the open end of the sleeve portion so as to define a first corner and a second corner where the tab joins the sleeve portion, the tab sized such that it is readily pullable;

(d) a scored line extending from the first corner across the sleeve portion and shoulder portion to the hole, the scored line scored such that when the tab is pulled, the thread protector splits from the open end of the sleeve portion to the hole defined by the shoulder portion along the scored line; and (e) an additional scored line extending from the second corner and running generally parallel to the scored line such that when the tab is pulled, a strip of material will be removed from the thread protector between the scored line and the additional scored line.

13. The gauge assembly of claim 12 wherein the sleeve portion has an inside surface and the thread protector further comprises at least one projection extending radially inwardly from the inside surface, the at least one projection sized to positively engage the threaded outer surface of the fitting.

14. The gauge assembly of claim 13 wherein the at least one projection comprises a continuous ring extending from the inside surface of the sleeve portion.

15. The gauge assembly of claim 12 wherein the thread protector is injected molded plastic.

16. The gauge assembly of claim 12 wherein the sleeve portion and shoulder portion have substantially the same thickness of about 0.02 to about 0.04 of an inch.

17. The gauge assembly of claim 12 wherein the scored line is defined by a line of decreased wall thickness compared to the wall thickness of the remainder of the sleeve portion and the shoulder portion.

18. A method of assembling a pre-installation liquid level gauge assembly which comprises a fitting with a threaded outer surface and an extension piece with a fixed end and a free end, comprising the steps of:

(a) friction fitting a thread protector over at least a portion of the threaded outer surface of the fitting, the thread protector comprising a sleeve portion having an open end for being slid over the second end of the fitting and towards the first end of the fitting, and a shoulder end longitudinally opposite the open end, the sleeve portion being of sufficient thickness to protect the portion of the threaded outer surface from being damaged during assembly; a shoulder portion extending radially inwardly from the shoulder end of the sleeve portion to define a hole with a diameter greater than the outer diameter of the passage, the shoulder portion of sufficient thickness to protect the second end from being damaged during assembly; a tab extending from the open end of the sleeve portion so as to define a first corner and a second corner where the tab joins the sleeve portion, the tab sized such that it is readily pullable; and a scored line extending from the first corner across the sleeve portion and shoulder portion to the hole, the scored line scored such that when the tab is pulled, the thread protector splits from the open end of the sleeve portion to the hole defined by the shoulder portion along the scored line;

(b) inserting the fixed end of the extension piece through the hole in the thread protector and into the passage of the fitting while the thread protector remains in place on the fitting; and (c) impregnating at least a portion of the threaded outer surface with a sealant before friction fitting the thread protector on the fitting.

19. The method of claim 18 further comprising the step of, when the assembly is ready for installation, pulling the tab of the thread protector so as to split the thread protector and remove the thread protector from the fitting.

20. A pre-installation liquid level gauge assembly, comprising:

(a) a fitting having a threaded outer surface and having a first end and a second end, the fitting defining a passage extending into the second end of the fitting;

(b) a thread protector friction fit over at least a portion of the threaded outer surface, the thread protector comprising (i) a sleeve portion having an open end for being slid over the second end of the fitting and towards the first end of the fitting, and a shoulder end longitudinally opposite the open end, the sleeve portion being of sufficient thickness to protect the portion of the threaded outer surface from being damaged during assembly;

(ii) a shoulder portion extending radially inwardly from the shoulder end of the sleeve portion to define a hole with a diameter greater than the outer diameter of the passage, the shoulder portion abutting alongside the second end of the fitting and extending radially inwardly sufficiently to prevent the shoulder from being pushed over the second end of the fitting, the shoulder portion being of sufficient thickness to protect the second end of the fitting from being damaged during assembly;

(iii) a tab extending from the open end of the sleeve portion so as to define a first corner and a second corner where the tab joins the sleeve portion, the tab sized such that it is readily pullable;

(iv) a scored line extending from the first corner across the sleeve portion and shoulder portion to the hole, the scored line scored such that when the tab is pulled, the thread protector splits from the open end of the sleeve portion to the hole defined by the shoulder portion along the scored line;

(d) an extension piece having a fixed end attached to the fitting at the passage and a free end opposite thereto;

(e) a float mechanism attached to the extension piece; and (f) a sealant impregnated in at least a portion of the threaded outer surface.

21. The gauge assembly of claim 20 wherein the sleeve portion has an inside surface and the thread protector further comprises at least one projection extending radially inwardly from the inside surface, the at least one projection sized to positively engage the threaded outer surface of the fitting.

22. The gauge assembly of claim 21 wherein the at least one projection comprises a continuous ring extending from the inside surface of the sleeve portion.

23. The gauge assembly of claim 20 wherein the thread protector is injected molded plastic.

24. The gauge assembly of claim 20 wherein the sleeve portion and shoulder portion have substantially the same thickness of about 0.02 to about 0.04 of an inch.

25. The gauge assembly of claim 20 wherein the scored line is defined by a line of decreased wall thickness compared to the wall thickness of the remainder of the sleeve portion and the shoulder portion.

* * * * *